US007808668B2

(12) United States Patent
Kobayashi

(10) Patent No.: US 7,808,668 B2
(45) Date of Patent: Oct. 5, 2010

(54) IMAGE FORMING SYSTEM, USER INTERFACE DEVICE AND IMAGE FORMING APPARATUS

(75) Inventor: Nobuyuki Kobayashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 933 days.

(21) Appl. No.: 11/653,226

(22) Filed: Jan. 16, 2007

(65) Prior Publication Data

US 2007/0279678 A1 Dec. 6, 2007

(30) Foreign Application Priority Data

May 31, 2006 (JP) ............................ 2006-151097

(51) Int. Cl.
*G06F 15/00* (2006.01)
*G08C 17/00* (2006.01)

(52) U.S. Cl. ..................................... 358/1.15; 370/311

(58) Field of Classification Search ................ 358/1.15, 358/1.14, 1.13, 1.16, 1.18, 412, 461, 422, 358/486, 443, 3.13; 399/33, 70, 81; 715/201, 715/728; 709/221, 241, 225; 347/9, 12, 347/13, 14; 370/311, 350, 324, 401; 713/320, 713/322, 300, 161, 190; 455/423, 554.1, 455/426.1, 412.2
See application file for complete search history.

(56) References Cited

U.S. PATENT DOCUMENTS 6,389,544 B1 5/2002 Katagiri
2006/0120314 A1* 6/2006 Krantz et al. ............... 370/311

FOREIGN PATENT DOCUMENTS

JP A 10-283142 10/1998
JP A 2000-056868 2/2000
JP A 2006-088513 4/2006

* cited by examiner

*Primary Examiner*—Saeid Ebrahimi Dehkordy
(74) *Attorney, Agent, or Firm*—Oliff & Berridge, PLC

(57) ABSTRACT

An image forming system includes an image forming apparatus and a user interface device. The image forming apparatus forms an image on a recording material. The user interface device is connected to the image forming apparatus. The user interface device accepts a user's input, outputs the input to the image forming apparatus and displays information based on data input from the image forming apparatus. The image forming apparatus sends a notification to the user interface device before the image forming apparatus executes a process of changing one operation mode to another operation mode. The process of changing includes disconnecting communication between the image forming apparatus and the user interface device. The user interface device displays information corresponding to the notification received from the image forming apparatus.

3 Claims, 10 Drawing Sheets

IMAGE FORMING SYSTEM, USER INTERFACE DEVICE AND IMAGE FORMING APPARATUS

CROSS-REFERENCE TO RELATED APPLICATIONS

This application is based on and claims priority under 35 U.S.C. §119 from Japanese Patent Application No. 2006-151097 filed May 31, 2006.

BACKGROUND

Technical Field

This invention relates to an image forming system, a user interface device and an image forming apparatus.

SUMMARY

According to an aspect of the invention, an image forming system includes an image forming apparatus and a user interface device. The image forming apparatus forms an image on a recording material. The user interface device is connected to the image forming apparatus. The user interface device accepts a user's input, outputs the input to the image forming apparatus and displays information based on data input from the image forming apparatus. The image forming apparatus sends a notification to the user interface device before the image forming apparatus executes a process of changing one operation mode to another operation mode. The operation of changing includes disconnecting communication between the image forming apparatus and the user interface device. The user interface device displays information corresponding to the notification received from the image forming apparatus.

BRIEF DESCRIPTION OF THE DRAWINGS

Exemplary embodiments of the invention will be described in detailed below with reference to the accompanying drawings wherein.

DETAILED DESCRIPTION

Exemplary embodiments of the invention will be described in detail with reference to the accompanying drawings.

Figure 1:
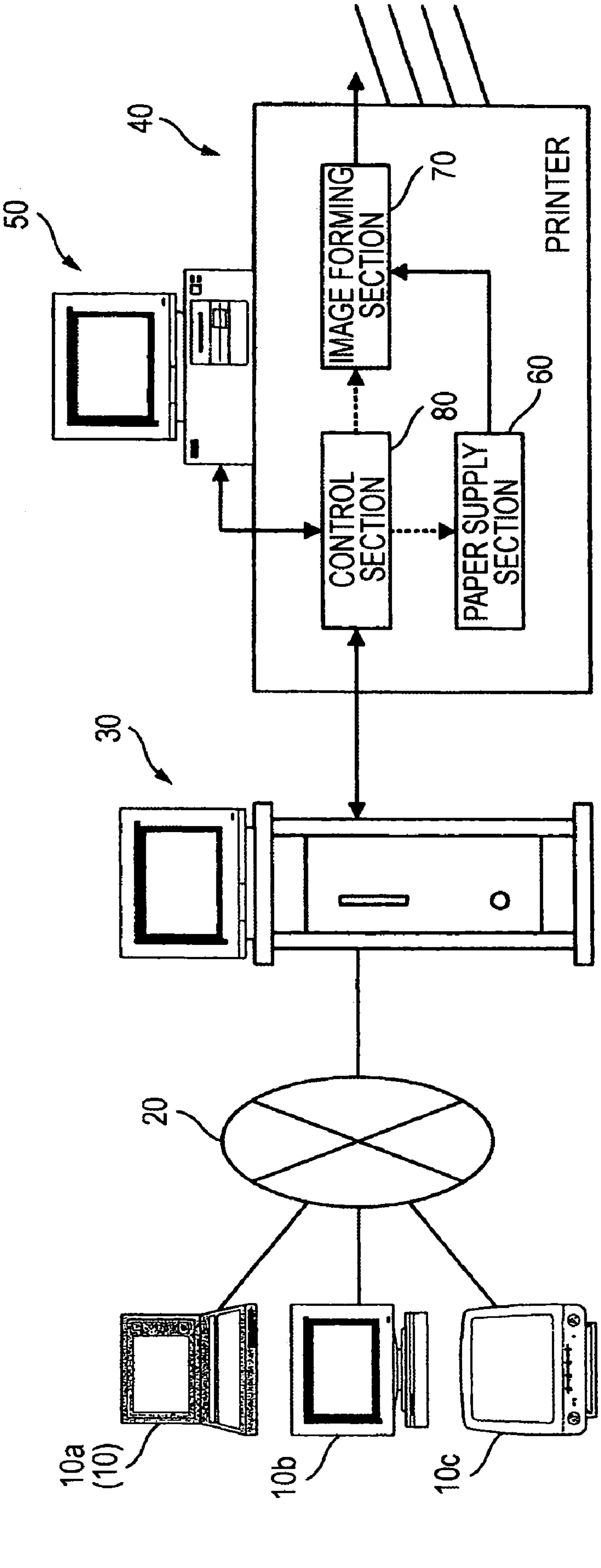
FIG. 1 is a drawing to show the general configuration of an image forming system according to an exemplary embodiment of the invention.

FIG. 1 is a drawing to show a configuration example of an image forming system according to this exemplary embodiment of the invention. The image forming system includes plural clients 10 (specifically, 10*a*, 10*b*, and 10*c*), a network 20, an external controller 30, a printer 40 and a UI (User Interface) unit 50.

Each of the clients 10 is connected to the network 20 and transmits job data, which contains print data written in a PDL (Page Description Language) and a command of executing an image forming operation, for example.

The external controller 30 is connected to the network 20, interprets the job data received through the network 20 and transmits obtained image formation data (bit map data).

The printer 40, which may serve as an image forming apparatus, is connected to the external controller 30 and forms an image on a sheet of paper, which is a target recording material, based on the image formation data received from the external controller 30.

The UI device 50, which may serve as a user interface device, is connected to the printer 40. The UI device 50 has a casing different (separate) from the printer 40 and may be implemented as a computer such as a PC (Personal Computer). The UI device 50 accepts settings of various image forming conditions for the printer 40 and transmits the obtained setup data to the printer 40, which then sets the various image forming conditions based on the received setup data. If an error of a paper-out condition, for example, occurs, the printer 40 transmits obtained error information to the UI device 50. In this case, the UI device 50 displays the received error information on a display section such as a display. Further, in the exemplary embodiment, the UI device 50 keeps track of the status of the printer 40 and displays the obtained status of the printer 40 on the display section.

The printer 40 includes a paper supply section 60, an image forming section 70 and a control section 80. The paper supply section 60 supplies a sheet of paper on which an image is to be formed to the image forming section 70. The image forming section 70 forms an image on the sheet of paper supplied by the paper supply section 60. In the exemplary embodiment, the image forming section 70 forms an image with electrophotography. However, in place of the electrophotography, any of various technologies such as ink jet or electrostatic record may be adopted as the image formation technology of the image forming section 70. Further, the control section 80 controls the whole of the operation and processes executed by the printer 40, such as the paper supply operation of the paper supply section 60 and the image forming operation of the image forming section 70. In the exemplary embodiment, the external controller 30 and the UI device 50 are connected to the control section 80.

The printer 40 can be set to a normal mode (non-power-saving state) for maintaining a function capable of immediately starting the image forming operation, by supplying power to the whole of the paper supply section 60 and the image forming section 70. The printer 40 can also be set to a power-saving mode for decreasing power consumed by the printer 40, by stopping or decreasing power supplied to all or apart of the paper supply section 60 and the image forming section 70. In the power-saving mode, the printer 40 cannot immediately start the image forming operation and needs to once change from the power-saving mode to the normal mode.

On the other hand, the UI device 50 can be set to an normal mode (non-power-saving state) for maintaining a function capable of immediately operating by supplying power to the whole of a CPU (Central Processing Unit), memory, a storage device such as a hard disk drive, and a display such as a liquid crystal display, which make up the computer. The UI device 50 can also be set to a power-saving mode for decreasing power consumed by the UI device 50 in a standby state, by stopping or decreasing power supplied to some of the CPU, the memory, the storage and the display. In the power-saving mode, the UI device 50 cannot immediately operate and needs to change once from the power-saving mode to the normal mode.

Figure 2:
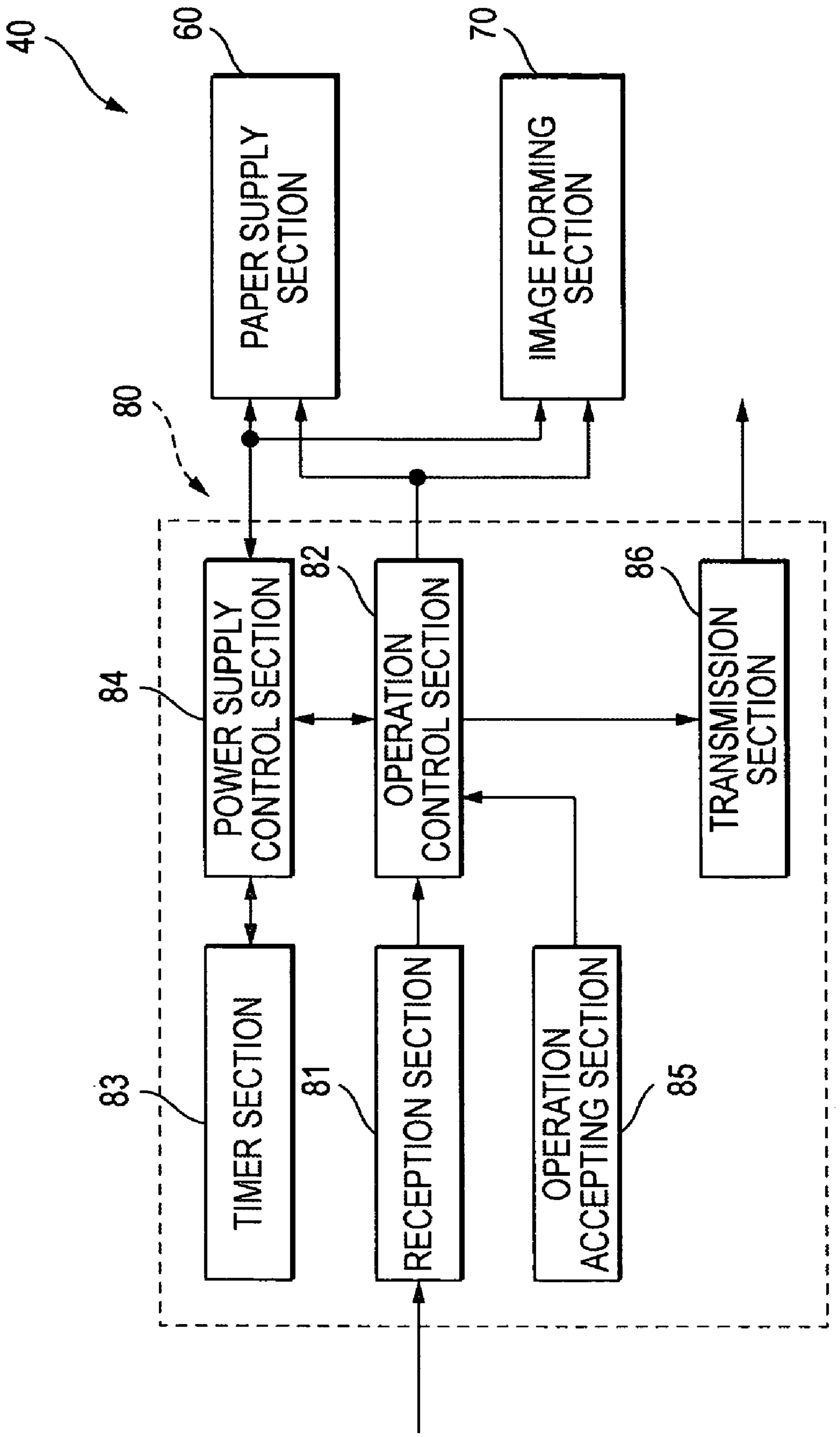
FIG. 2 is a functional block diagram of a control section provided in a printer.

FIG. 2 is a functional block diagram of the control section 80 provided in the printer 40.

The control section 80 includes a reception section 81, an operation control section 82, a timer section 83 and a power supply control section 84. The control section 80 further includes an operation accepting section 85 and a transmission section 86.

The reception section 81 receives the image formation data transmitted from the external controller 30 and the setup data of various image forming conditions transmitted from the UI device 50.

The operation control section 82 sets the operation conditions in the paper supply section 60 and the image forming section 70 based on the setup data received by the reception section 81. The operation control section 82 controls the paper supply section 60 and the image forming section 70 in which the operation conditions are set based on the image formation data received by the reception section 81, to form an image on a sheet of paper. Further, the operation control section 82 inquires of the power supply control section 84, for example, to keep track of the power supply status of the printer 40. Further, the operation control section 82 turns on/off the printer 40 and restarts the printer 40, in accordance with an operation command accepted through the operation accepting section 85 described later. The operation control section 82 monitors communication with the UI device 50 (specifically, communication with a reception section 51/a transmission section 56 described later) through the reception section 81 and the transmission section 86.

The timer section 83 incorporates a clock and outputs a timer interrupt signal to the power supply control section 84 each time a given time has elapsed.

The power supply control section 84 performs power supply control for the paper supply section 60 and the image forming section 70. In the exemplary embodiment, the printer 40 can be set to either of the two modes of the normal mode and the power-saving mode as described above. Then, the power supply control section 84 causes the paper supply section 60 and the image forming section 70 to change from the normal mode to the power-saving mode based on the time count result of the timer section 83. When a transition command to the power-saving mode is accepted through the operation accepting section 85, for example, the power supply control section 84 may cause the paper supply section 60 and the image forming section 70 to change from the normal mode to the power-saving mode. When the paper supply section 60 and the image forming section 70 are placed in the power-saving mode and the reception section 81 receives image formation data from the external controller 30, the power supply control section 84 restores the paper supply section 60 and the image forming section 70 to the normal mode. When a transition command to the normal mode is accepted through the operation accepting section 85, for example, the power supply control section 84 also restores the paper supply section 60 and the image forming section 70 to the normal mode.

The operation accepting section 85 includes a control panel and a power switch, for example, and accepts a user's power operation (on/off), restart of the printer 40 and setting to a particular operation mode. As the particular operation mode, a mode for updating various types of software operating on the printer 40 (download mode) and a mode for diagnosing the printer 40 (diagnostic mode) can be named, for example.

The transmission section 86 transmits various signals output from the operation control section 82, to the external controller 30 and the UI device 50. In the exemplary embodiment, the reception section 81 and the transmission section 86 may serve as a communication section.

Figure 3:
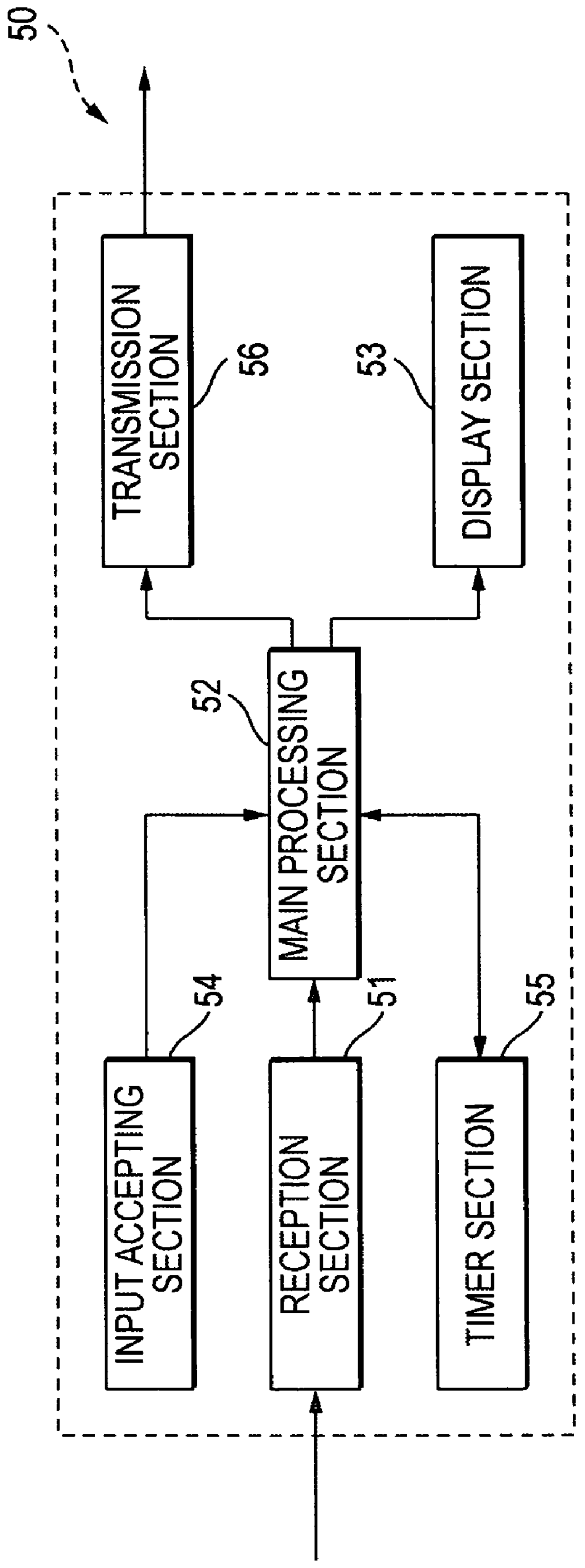
FIG. 3 is a functional block diagram of a UI device.

FIG. 3 is a functional block diagram of the UI device 50.

The UI device 50 includes the reception section 51, a main processing section 52, a display section 53, an input accepting section 54, a timer section 55 and the transmission section 56.

The reception section 51 receives various signals transmitted from the control section 80 of the printer 40.

The main processing section 52 executes various types of processing based on the various signals received by the reception section 51 and user's input data accepted through the input accepting section 54. The main processing section 52 also monitors communications between (i) the control section 80 of the printer 40 (specifically, the reception section 81 and the transmission section 86) and (ii) the reception section 51/transmission section 56.

The display section 53 displays an image obtained as a process result of the main processing section 52.

The input accepting section 54 includes an input device such as a mouse and a keyboard, for example. The input accepting section 54 accepts data input by the user and outputs the accepted user's input data to the main processing section 52.

The timer section 55 incorporates a clock and measures the time based on a command from the main processing section 52.

If setup data of various image forming conditions is input as user's input data through the input accepting section 54, the transmission section 56 transmits the setup data to the control section 80 of the printer 40. In the exemplary embodiment, the reception section 51 and the transmission section 56 may serve as a transmission/reception section.

The UI device 50 may be implemented as a PC as described above. An input program of the setup data may be operated in an OS such as Windows (registered trademark). Thus, the UI device 50 controls the power supply status based on power management standard of ACPI (Advanced Configuration and Power Interface).

Figure 4:
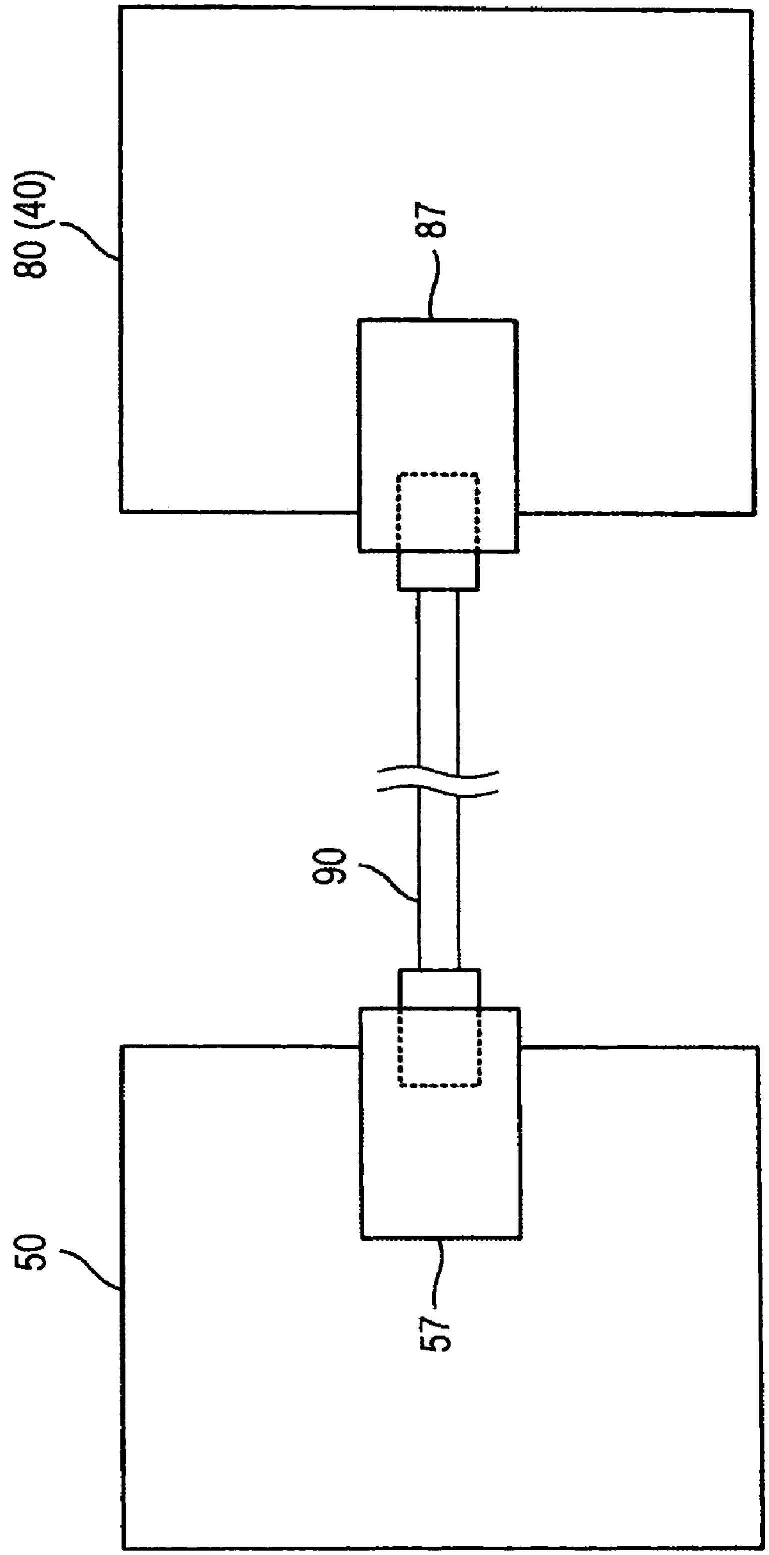
FIG. 4 is a drawing to explain connection between the printer and the UI device in detail.

FIG. 4 is a drawing to explain connection between the printer 40 and the UI device 50 in detail. The control section 80 of the printer 40 includes an Ethernet connector 87, and the UI device 50 includes an Ethernet connector 57. An Ethernet cable 90 is connected to the Ethernet connectors 57 and 87. The Ethernet connector 57 is a hardware including the function of the reception section 51 and the transmission section 56 shown in FIG. 3. The Ethernet connector 87 is a hardware including the function of the reception section 81 and the transmission section 86 shown in FIG. 2. The printer 40 and the UI device 50 are connected directly by the Ethernet cable 90.

If the Ethernet connector 87 provided in the printer 40 detects that the Ethernet cable 90 is physically connected, the Ethernet connector 87 outputs a detection signal to the operation control section 82. That is, the Ethernet connector 87 may serve as a detection section. Upon reception of the detection signal, the operation control section 82 sends a notification that a physical link with the UI device 50 is established through the Ethernet connector 87 (transmission section 86) and the Ethernet cable 90.

On the other hand, if the Ethernet connector 57 provided in the UI device 50 detects that the Ethernet cable 90 is physically connected, the Ethernet connector 57 outputs a detection signal to the main processing section 52. Upon reception of the detection signal, the main processing section 52 sends a notification that a physical link with the printer 40 is established through the Ethernet connector 57 (transmission section 56) and the Ethernet cable 90.

Next, the image forming operation in the image forming system will be described.

First, before the actual image forming operation is started, the user sets various image forming conditions using the UI device 50. The input accepting section 54 accepts the various image forming conditions, and the main processing section 52 processes the various image forming conditions so as to generate setup data. Then the transmission section 56 transmits the setup data to the control section 80 of the printer 40.

In the printer 40, the reception section 81 of the control section 80 receives the setup data, and the operation control section 82 sets the operation conditions in the paper supply section 60 and the image forming section 70.

Now, it is made possible to execute the image forming operation in the printer 40.

Next, the external controller 30 receives job data transmitted through the network 20 from any of the clients 10*a* to 10*c*. The external controller 30 converts the received job data into image formation data (bit map data) and transmits the image formation data to the printer 40.

The printer 40 forms an image base on the image formation data input from the external controller 30 and the image forming conditions set in the UI device 50. That is, an image is formed on a sheet of paper supplied from the paper supply section 60 using the image forming section 70, and then the sheet of paper is output.

By the way, the UI device 50 monitors the status of the printer 40 by communicating with the printer 40 and displays the obtained status of the printer 40 on the display section 53. Particularly, in the exemplary embodiment, when the printer 40 executes a predetermined process, which includes disconnection of the communication, the printer 40 notifies to the UI device 50 that the communication between the printer 40 and the UI device 50 will be disconnected, in advance. The status of the printer 40 mentioned here is the power status of the printer 40 (off, on, restart), an operation-mode transition process in the printer 40 (power supply mode (normal mode/power-saving mode), whether or not the printer 40 is in a particular operation mode), whether or not an anomaly occurs in the communication between the printer 40 and the UI device 50, for example. These will be described below in detail.

Figure 5:
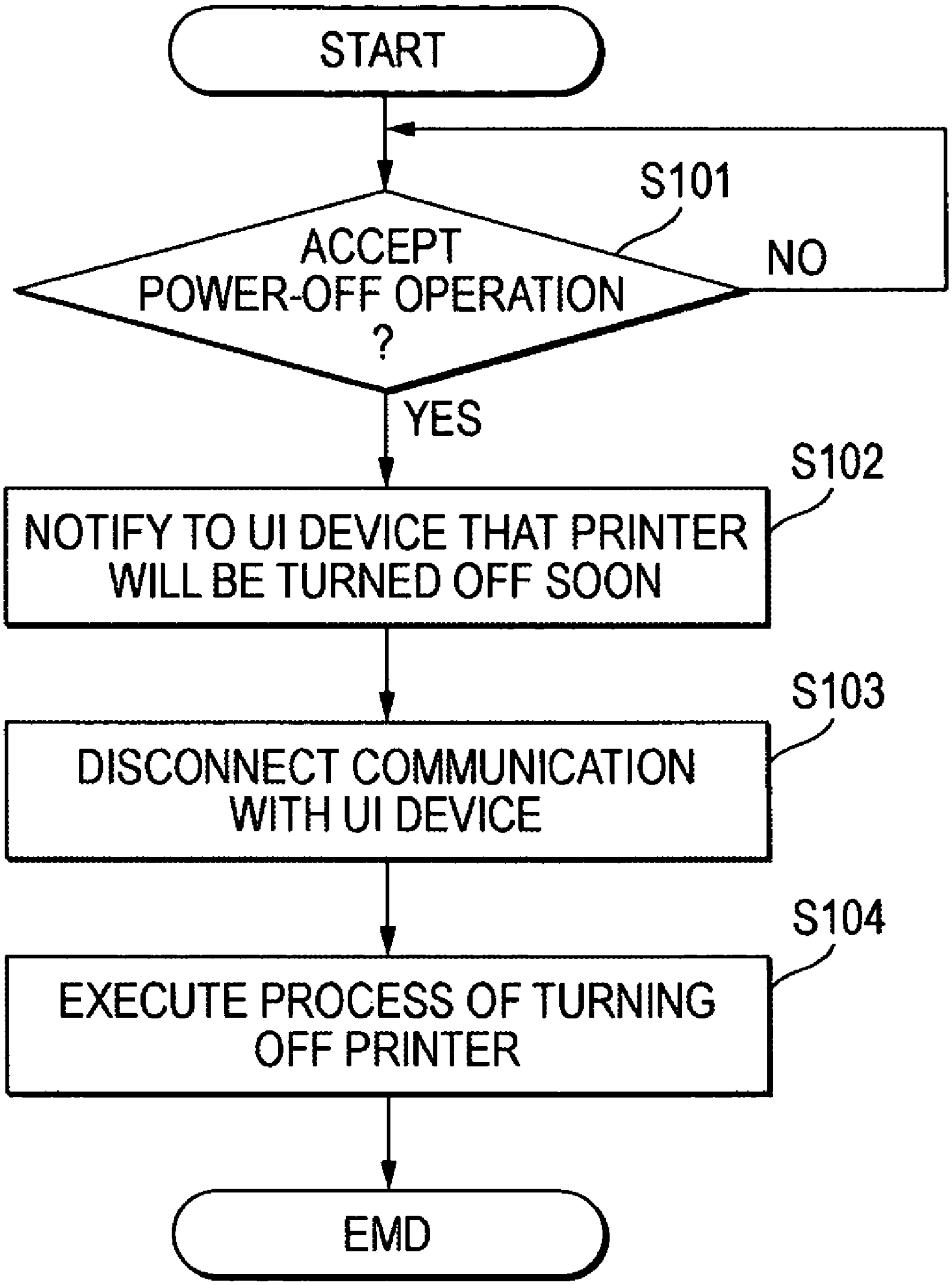
FIG. 5 is a flowchart to show a flow of processing when the printer is turned off.

FIG. 5 is a flowchart to show a flow of processing executed by the printer 40 when the printer 40 is turned off.

The operation control section 82 first determines as to whether or not the power off operation is accepted as a predetermined operation command through the operation accepting section 85 (step 101). If the operation control section 82 determines that the power off operation is accepted, the operation control section 82 transmits a notification (command) that the printer 40 will be turned off to the UI device 50 through the transmission section 86 (step 102). If the operation control section 82 does not determine that the power off operation is accepted, the operation control section 82 returns to step 101 and continues the processing.

Next, the operation control section 82 instructs the transmission section 86 to disconnect the communication with the UI device 50. Accordingly, the transmission section 86 disconnects the communication with the UI device 50 (reception section 51). Also, the reception section 81 disconnects communications with the UI device 50 (transmission section 56) (step 103). The operation control section 82 executes the process of turning off the printer 40 (step 104). Consequently, the printer 40 is turned off.

Figure 6:
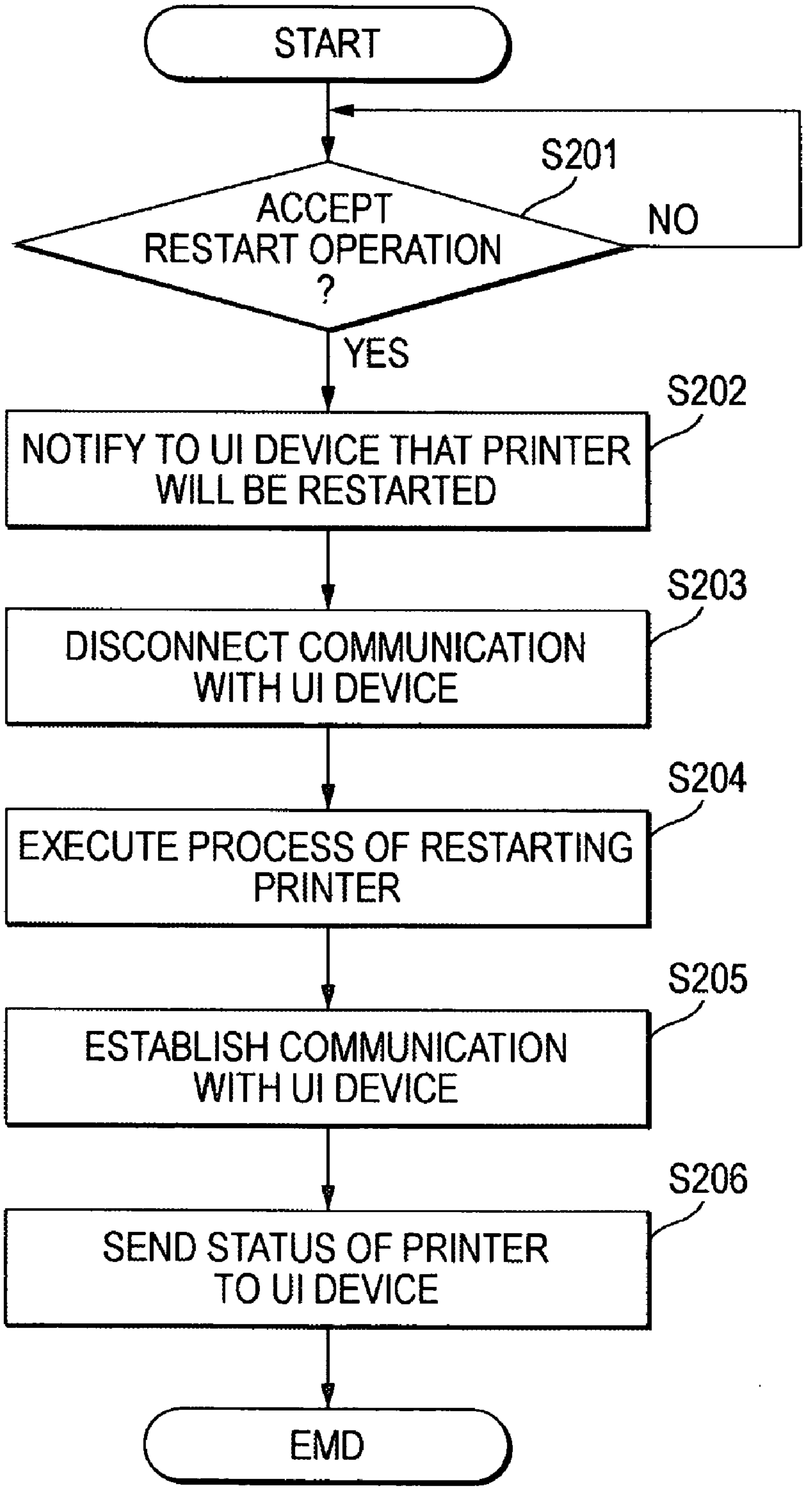
FIG. 6 is a flowchart to show a flow of processing when the printer is restarted.

FIG. 6 is a flowchart to show a flow of processing executed by the printer 40 when the printer 40 restarts.

The operation control section 82 first determines as to whether or not a restart operation is accepted as a predetermined operation command through the operation accepting section 85 (step 201). If the operation control section 82 determines that the restart operation is accepted, the operation control section 82 transmits a notification (command) that restarting of the printer 40 will be executed to the UI device 50 through the transmission section 86 (step 202). If the operation control section 82 does not determine that restart operation is accepted, the operation control section 82 returns to step 201 and continues the process.

Next, the operation control section 82 instructs the transmission section 86 to disconnect the communication with the UI device 50. Accordingly, the transmission section 86 disconnects the communication with the UI device 50 (reception section 51). Also, the reception section 81 disconnects the communication with the UI device 50 (transmission section 56) (step 203). The operation control section 82 executes the process of restarting the printer 40 (step 204). Consequently, the printer 40 is restarted. After the process of restarting the printer 40 is performed, the operation control section 82 instructs the transmission section 86 to start communication with the UI device 50. The transmission section 86 establishes communication with the UI device 50 (reception section 51) and the reception section 81 also establishes communication with the UI device 50 (transmission section 56) (step 205). Then, the operation control section 82 sends the status of the printer 40 to the UI device 50 through the transmission section 86 (step 206).

Figure 7:
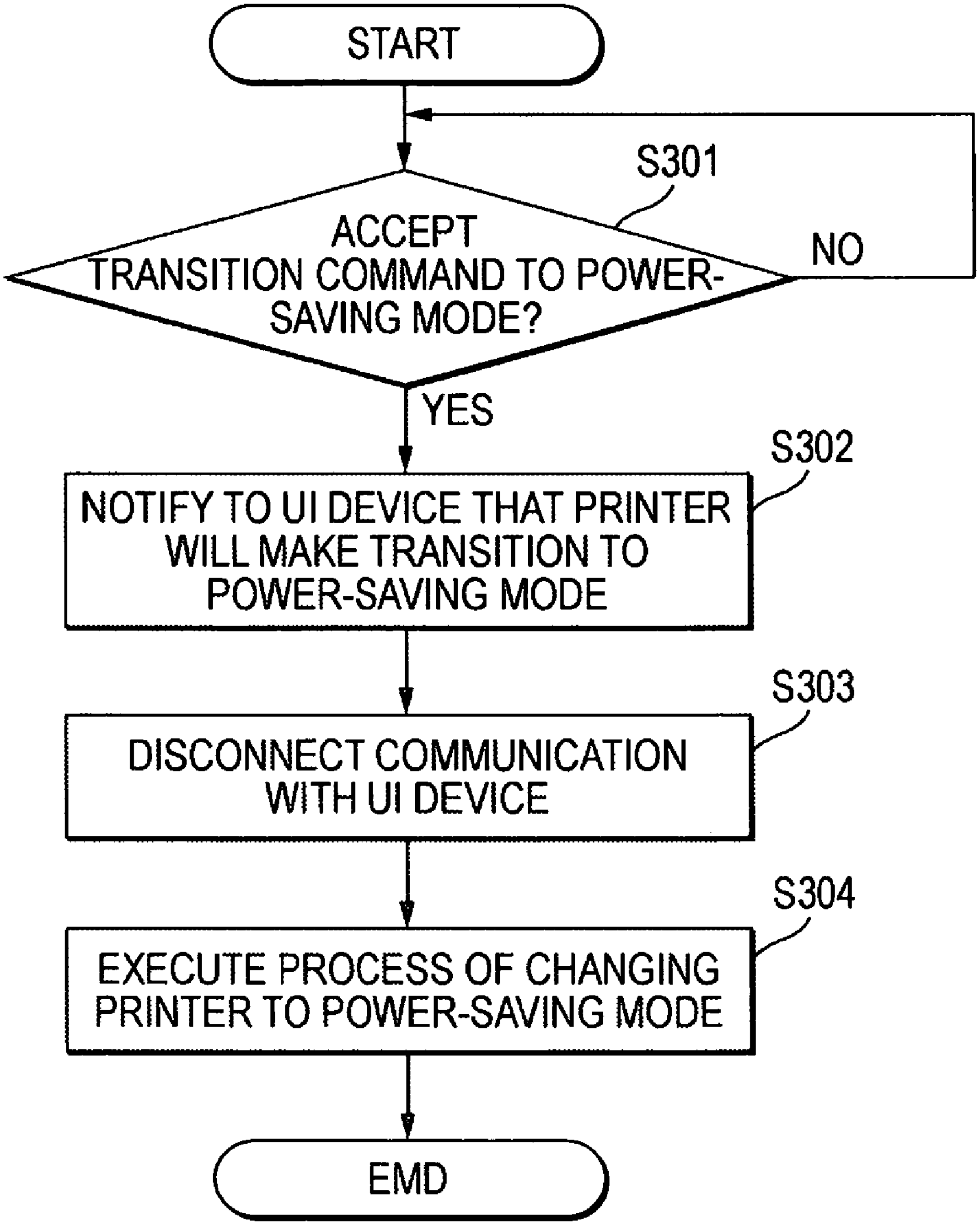
FIG. 7 is a flowchart to show a flow of processing when the printer proceeds to a power-saving mode.

FIG. 7 is a flowchart to show a flow of processing executed by the printer 40 when the printer 40 changes from the normal mode to the power-saving mode.

The operation control section 82 first determines as to whether or not a transition command to the power-saving mode is input as a predetermined operation command in the power supply control section 84 (step 301). If the operation control section 82 determines that a transition command to the power-saving mode is input, the operation control section 82 transmits to the UI device 50 through the transmission section 86 a notification that the printer 40 will change to the power-saving mode (command) (step 302). If the operation control section 82 does not determine that a transition command to the power-saving mode is input, the operation control section 82 returns to step 301 and continues the process.

Next, the operation control section 82 instructs the transmission section 86 to disconnect communication with the UI device 50. Accordingly, the transmission section 86 disconnects the communication with the UI device 50 (reception section 51). Also, the reception section 81 disconnects communication with the UI device 50 (transmission section 56) (step 303). The operation control section 82 causes the power supply control section 84 to execute a process of changing the printer 40 (particularly the paper supply section 60 and the image forming section 70) to the power-saving mode (step 304). Consequently, the printer 40 operates in the power-saving mode.

Figure 8:
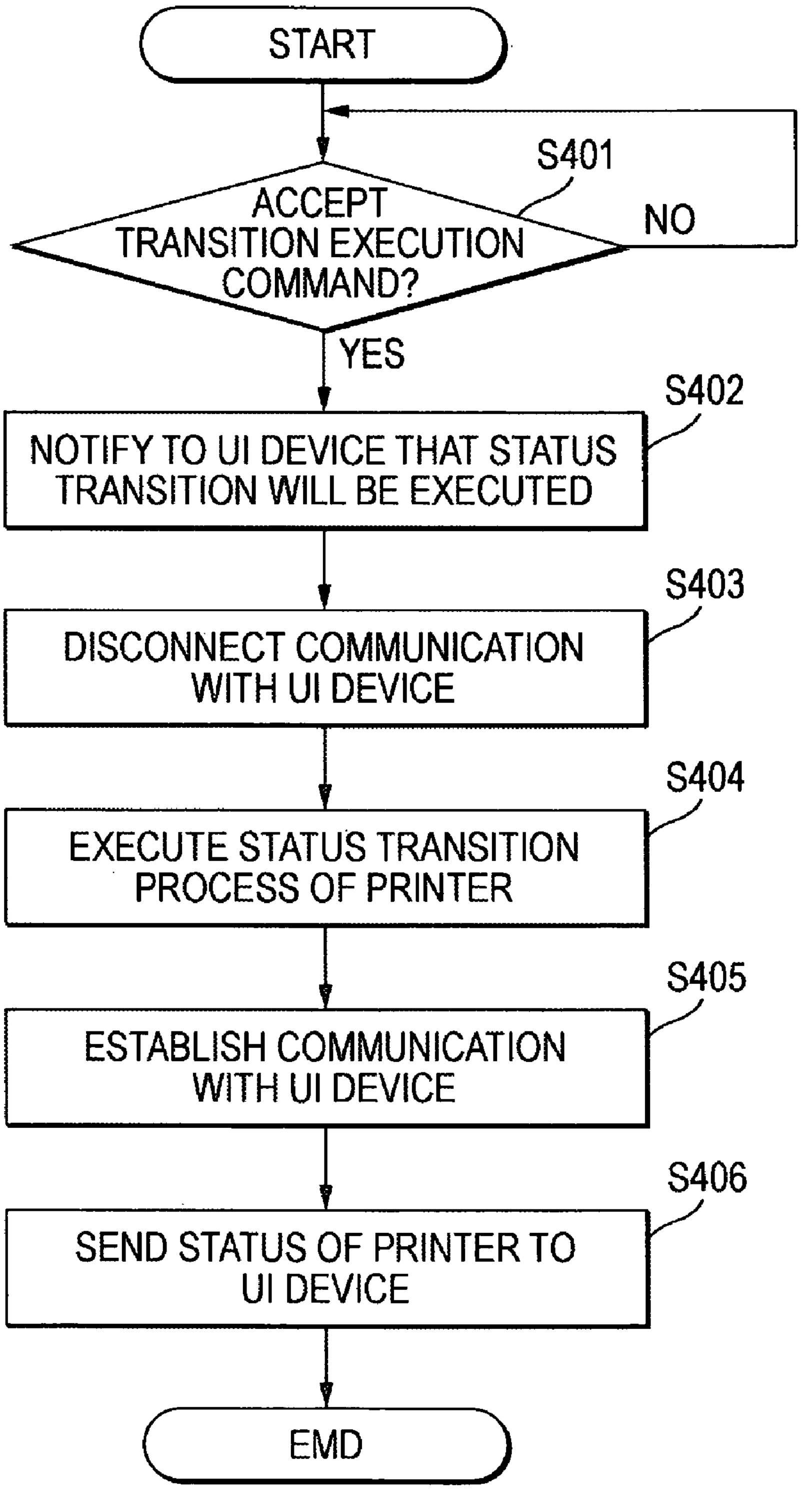
FIG. 8 is a flowchart to show a flow of processing when a status transition is made in the printer.

FIG. 8 is a flowchart to show a flow of process executed by the printer 40 when the printer 40 makes a status transition. The status transition mentioned here refers to the mode transition operation, which includes disconnecting of communication; for example, the "status transition" refers to a transition from the normal operation mode to a particular operation mode (e.g. the above-mentioned download mode).

The operation control section 82 first determines as to whether or not a status transition execution command is accepted through the operation accepting section 85 (step 401). If the operation control section 82 determines that the status transition execution command is accepted, the operation control section 82 transmits to the UI device 50 through the transmission section 86 a notification (command) that a status transition of the printer 40 will be executed (step 402). If the operation control section 82 does not determine that the status transition execution command is accepted, the operation control section 82 returns to step 401 and continues the process.

Next, the operation control section 82 instructs the transmission section 86 to disconnect communication with the UI device 50. Accordingly, the transmission section 86 disconnects the communication with the UI device 50 (reception section 51). Also, the reception section 81 disconnects communication with the UI device 50 (transmission section 56) (step 403). The operation control section 82 executes the status transition process of the printer 40 (step 404). Consequently, the printer 40 changes from the normal operation mode to a particular operation mode, for example. After the status transition process of the printer 40 is executed, the operation control section 82 instructs the transmission section 86 to start communication with the UI device 50. Accordingly, the transmission section 86 establishes the communication with the UI device 50 (reception section 51) and the reception section 81 also establishes the communication with the UI device 50 (transmission section 56), and communication is started (step 405). Then, the operation control section 82 sends the status of the printer 40 to the UI device 50 through the transmission section 86 (step 506).

Figure 9:
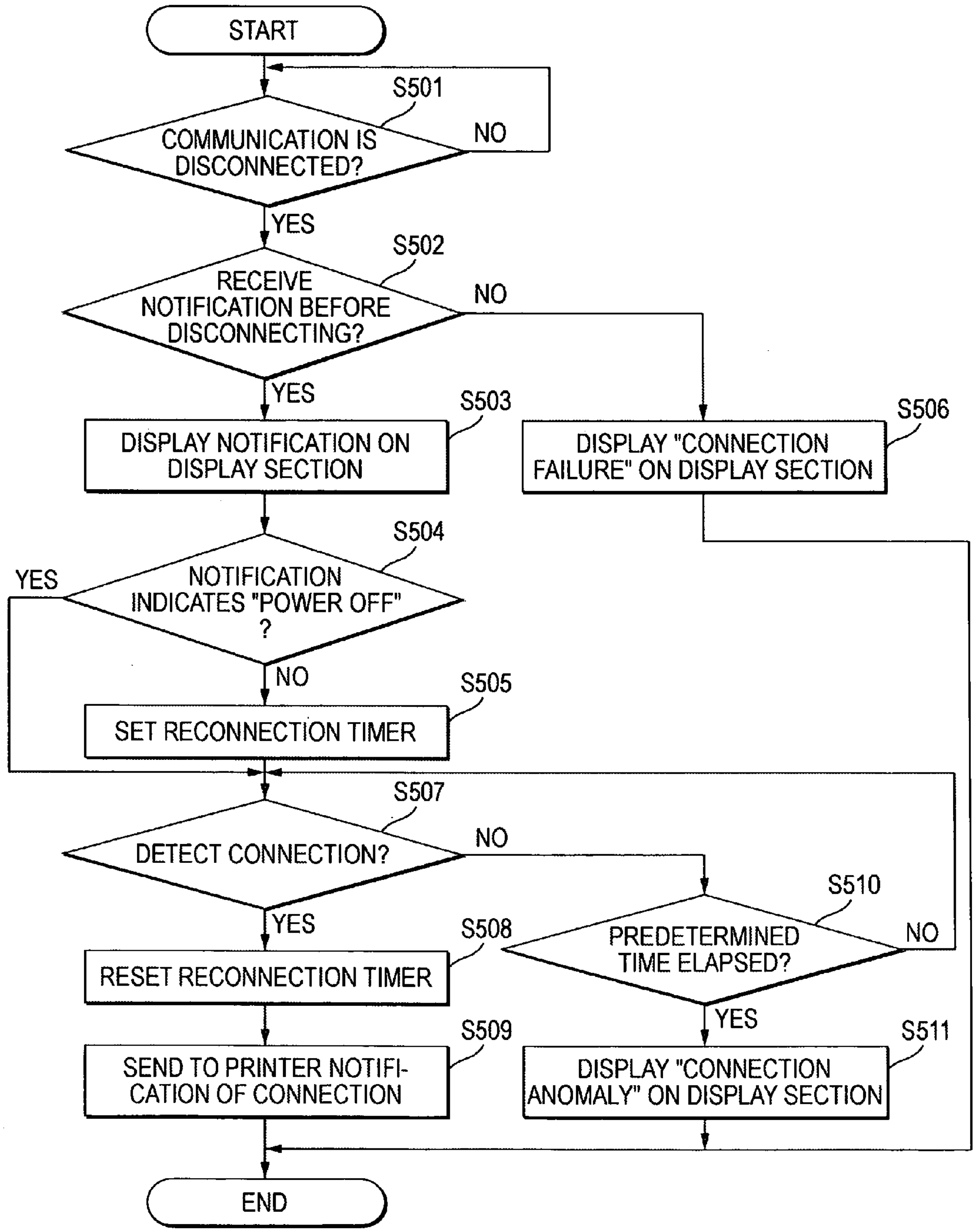
FIG. 9 is a flowchart to show a flow of processing executed in the UI device when communications between the UI device and the printer is disconnected.

On the other hand, FIG. 9 is a flowchart to show a flow of process executed by the UI device 50 while the UI device is monitoring the status of the printer 40.

The main processing section 52 first determines as to whether or not communication with the printer 40 (the transmission section 86 of the control section 80) through the reception section 51 is disconnected (step 501). If the main processing section 52 determines that the communication with the printer 40 is disconnected, the main processing section 52 determines as to whether or not a notification is received before the disconnecting of the communication through the reception section 51 (step 502). The notification mentioned here may be any of the power-o-ff notification of the printer 40 at step 102 (see FIG. 5), the restart notification of the printer 40 at step 202 (see FIG. 6), the transition notification to the power-saving mode of the printer 40 at step 302 (see FIG. 7), and the status transition notification of the printer 40 at step 402 (see FIG. 8).

If the main processing section 52 determines that the notification is received before the disconnecting of the communication, the main processing section 52 displays contents of the received notification on the display section 53 (step 503). That is, for example, if the power-off notification is received, a message such as "printer will be turned off soon" may be displayed; if the restart notification is received, a message such as "printer is being restarted" may be displayed; if the transition notification to the power-saving mode is received, a message such as "printer is making a transition to power-saving mode" may be displayed; if the status transition notification (transition to the download mode) is received, a message such as "printer is making a transition to a download mode" may be displayed. Next, the main processing section 52 determines as to whether or not the received notification is the power-off notification (step 504) If the main processing section 52 does not determine that the received notification is power-off notification, the main processing section 52 instructs the timer section 55 to set a reconnection timer (step 505). The reconnection timer is set to a duration corresponding to the time period required for restarting the printer 40, for example. On the other hand, if the main processing section 52 determines at step 504 that the received notification is power-off notification, the process goes to step 507.

If the main processing section 52 does not determine at step 502 that a notification is received before the disconnecting of the communication, the main processing section 52 displays on the display section 53 that a failure occurs in connecting with the printer 40 (step 506). At step 506, the main processing section 52 may display on the display section that an anomaly occurs in the printer 40 itself.

The main processing section 52 determines as to whether or not connection to the printer 40 (the transmission section 86 of the control section 80) is detected through the reception section 51 (step 507). If the connection is detected, the main processing section 52 instructs the timer section 55 to reset the reconnection timer (step 508). Then, the main processing section 52 sends to the printer 40 (the transmission section 86 of the control section 80) a notification that the connection is established (step 509). On the other hand, if the main processing section 52 does not detect the connection at step 507, the main processing section 52 determines as to whether or not the time counting result of the timer section 55 exceeds a predetermined time (step 510). If the main processing section 52 determines that the predetermined time has elapsed, the main processing section 52 displays on the display section 53 that an anomaly occurs in the connection to the printer 40 (step 511). At step 511, the main processing section 52 may display on the display screen 52 that an anomaly occurs in the printer 40 itself. On the other hand, if the main processing section 52 does not determine that the predetermined time has elapsed, the main processing section 52 returns to step 507 and continues the process.

In the exemplary embodiment, the UI device 50 may also determine whether the power of the printer 40 is on or off, using communication technology of Ethernet (registered trademark).

Figure 10A:
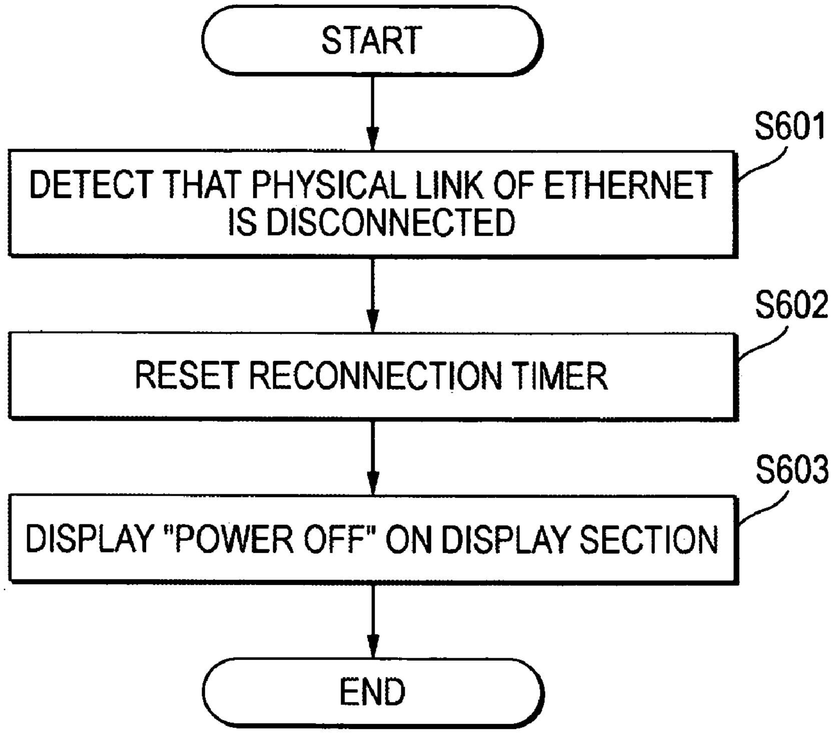
FIG. 10A is a flowchart to show a flow of processing executed by the UI device, for detecting power-off of the printer.

FIG. 10A is a flowchart to show a process, executed by the UI device 50, of detecting power off of the printer 40.

If the main processing section 52 of the UI device 50 detects that the physical link of Ethernet (registered trademark) established with the printer 40 is disconnected (step 601), the main processing section 52 instructs the timer section 55 to reset the reconnection timer (step 602). The main processing section 52 displays a message such as "a printer has been turned off" on the display section 53 (step 603).

Figure 10B:
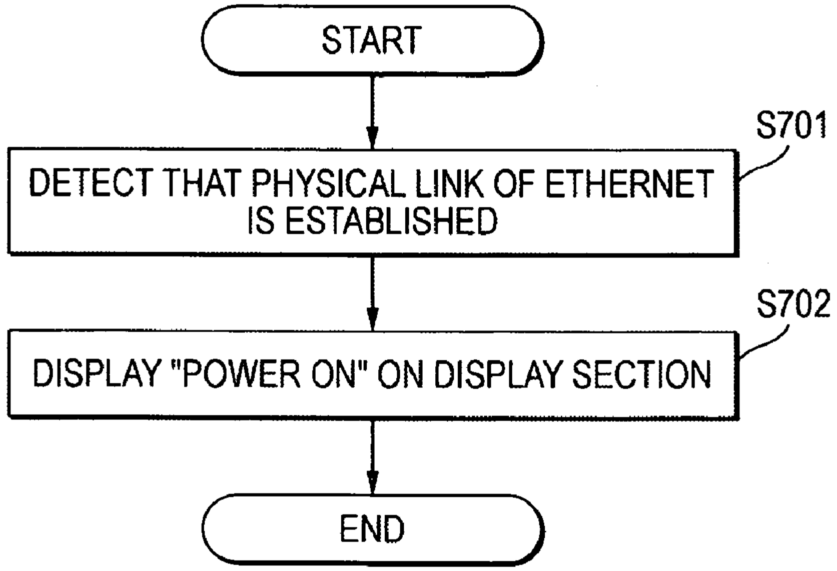
FIG. 10B is a flowchart to show a flow of processing executed by the UI device, for detecting power-on of the printer.

On the other hand, FIG. 10B is a flowchart to show a process, executed by the UI device 50, of detecting power on of the printer 40.

If the main processing section 52 of the UI device 50 detects that the physical link of Ethernet (registered trademark) is established with the printer 40 (step 701), the main processing section 52 displays a message such as "a printer has been turned on" on the display section 53 (step 702).

For example, control may also be performed using (i) notification from the printer 40 and (ii) disconnection and establishment of the physical link of Ethernet (registered trademark) in combination. For example, when a power-off notification is sent from the printer 40, a message of "a printer will be turned off soon" is displayed on the display section 53 of the UI device 50. When the physical link of Ethernet (registered trademark) is disconnected, a message displayed on the display section 53 may be switched to a message of "a printer has been turned off."

The foregoing description of the exemplary embodiments of the invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming system comprising: an image forming apparatus that forms an image on a recording material; and a user interface device connected to the image forming apparatus, the user interface device that accepts a user's input, outputs the input to the image forming apparatus and displays information based on data input from the image forming apparatus, wherein: the image forming apparatus sends a notification to the user interface device before the image forming apparatus executes a process of changing one operation mode to another operation mode, the process including disconnecting communication between the image forming apparatus and the user interface device, and the user interface device displays information corresponding to the notification received from the image forming apparatus, wherein the process includes changing from a normal mode to a power-saving mode; and wherein when the user interface device receives from the image forming apparatus the notification indicating that the image forming apparatus will execute the process of changing and then the user interface device does not establish the communication with the image forming apparatus after a predetermined time elapses since the receiving of the notification, the user interface device displays that anomaly occurs in the image forming apparatus or in the communication between the user interface device and the image forming apparatus.

2. The system according to claim 1, wherein the process includes at least one of changing from a normal mode to a download mode and changing from a normal mode to a diagnostics mode.

3. The system according to claim 1, wherein when the connection between the user interface device and the image forming apparatus is disconnected without the user interface device receiving the notification from the image forming apparatus, the user interface device displays that anomaly occurs in the image forming apparatus or in the communication between the user interface device and the image forming apparatus.

* * * * *